April 12, 1966   J. W. RYAN   3,245,688
SPEAKING DOLL AND PHONOGRAPH DEVICE THEREFOR
Filed March 29, 1962   5 Sheets-Sheet 1

JOHN W. RYAN
INVENTOR.

BY

ATTORNEY

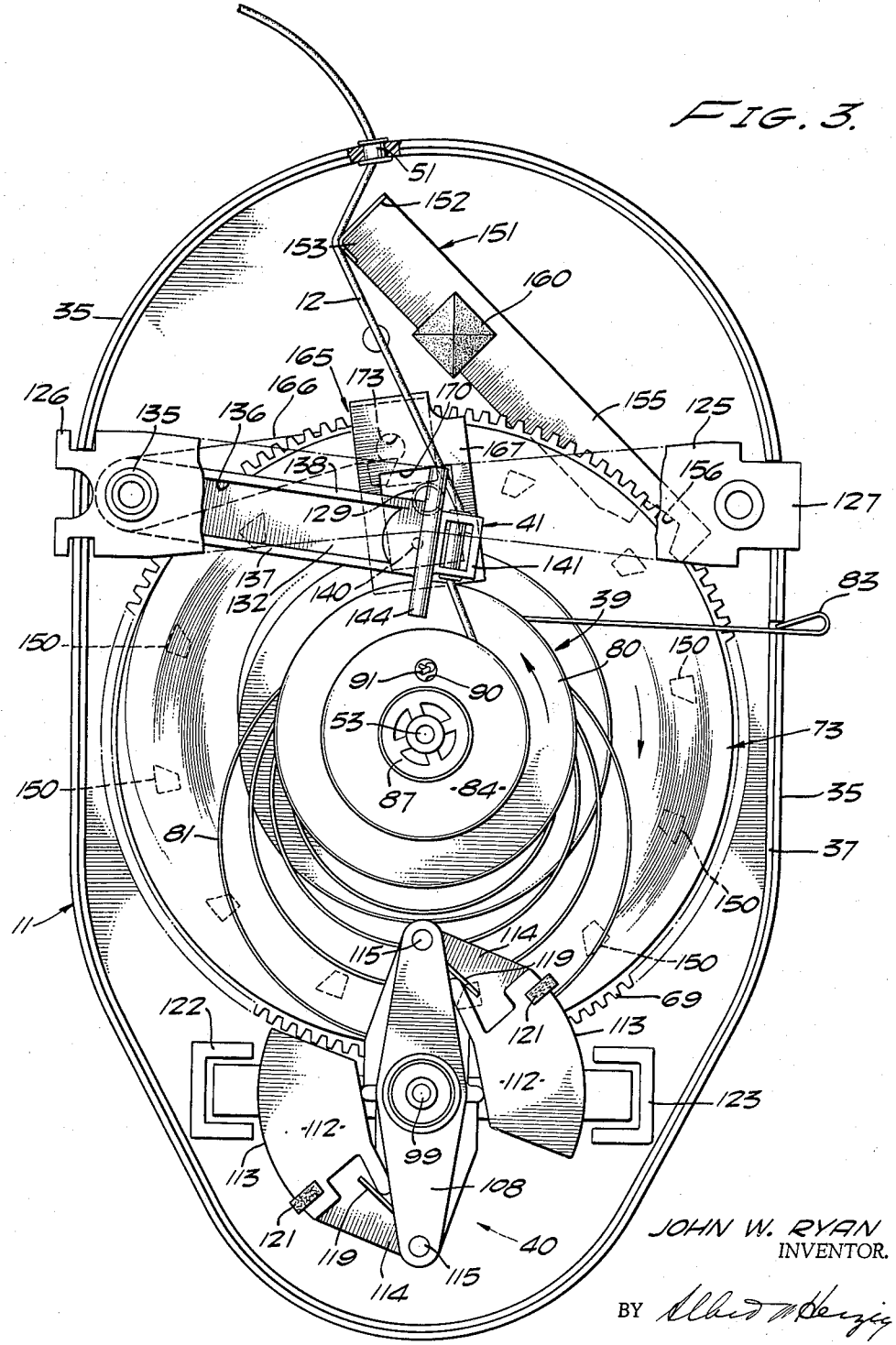

April 12, 1966 J. W. RYAN 3,245,688
SPEAKING DOLL AND PHONOGRAPH DEVICE THEREFOR
Filed March 29, 1962 5 Sheets-Sheet 3

JOHN W. RYAN
INVENTOR.

BY
ATTORNEY

April 12, 1966 J. W. RYAN 3,245,688
SPEAKING DOLL AND PHONOGRAPH DEVICE THEREFOR
Filed March 29, 1962 5 Sheets-Sheet 4
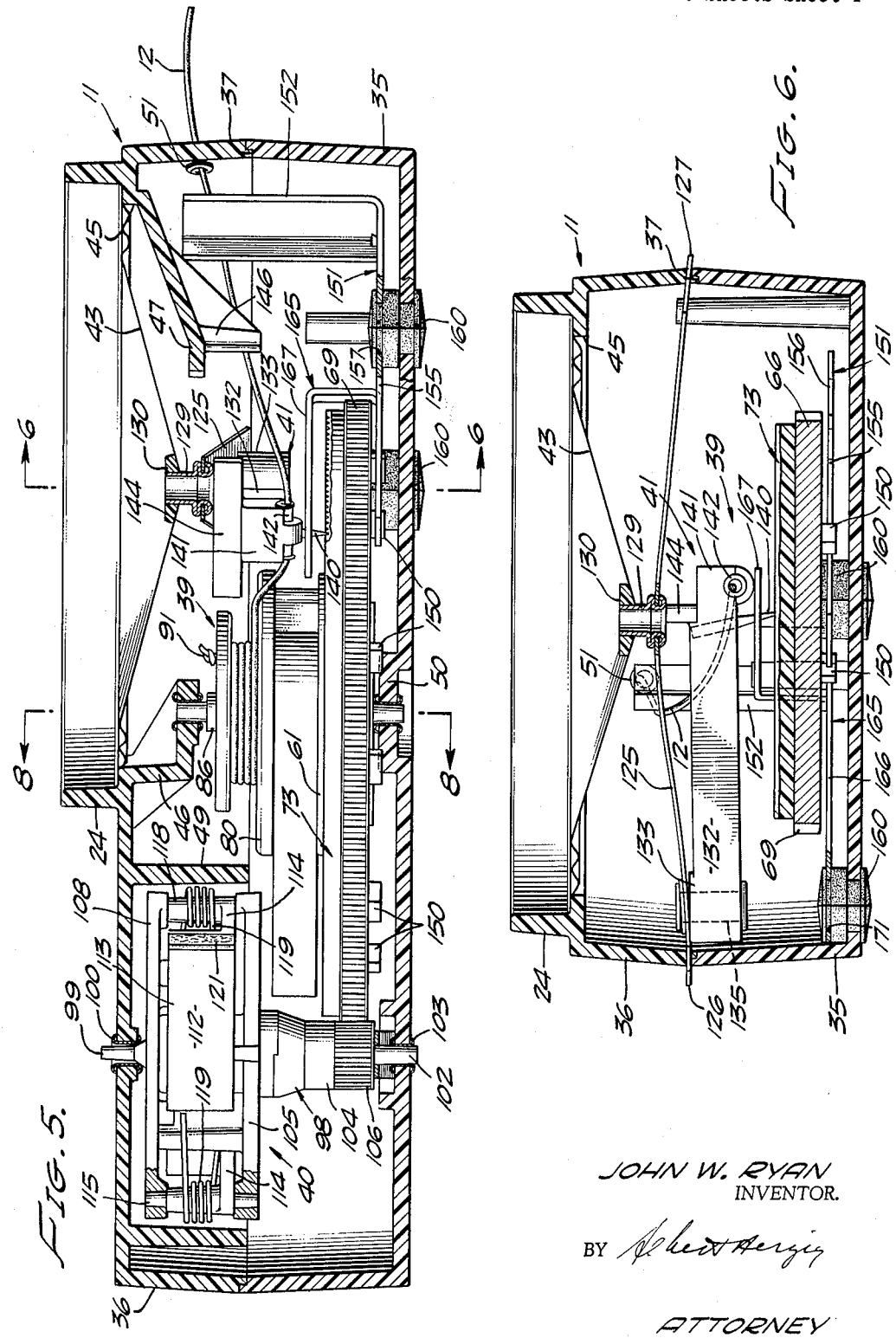
JOHN W. RYAN
INVENTOR.
BY
ATTORNEY April 12, 1966          J. W. RYAN          3,245,688
SPEAKING DOLL AND PHONOGRAPH DEVICE THEREFOR
Filed March 29, 1962                                    5 Sheets-Sheet 5

JOHN W. RYAN
INVENTOR.

BY *Albert Henzel*

ATTORNEY

& 245,688
Patented Apr. 12, 1966

3,245,688
SPEAKING DOLL AND PHONOGRAPH
DEVICE THEREFOR
John W. Ryan, 11027 Cashmere St., Bel Air, Calif.
Filed Mar. 29, 1962, Ser. No. 183,656
6 Claims. (Cl. 274—1)

This application is a continuation-in-part of previously filed application, Serial No. 11,023, filed February 25, 1960 now U. S. Patent No. 3,017,187, and also of previously filed application, Serial No. 83,965, filed February 10, 1961 now U.S. Patent No. 3,082,006.

This invention relates to a doll (or other figure) which is operative in response to an impulse or manipulation to speak or pronounce any one of a number of different words, phrases or sentences, or any other series or group of sounds in response to the said impulse or manipulation. Preferably, the impulse is produced by a single control instrumentality. Additionally, the device has a random characteristic whereby the sounds can be produced selectively at random or not at random.

The concept embraces any type of mechanism which in response to any input impulse, or an input impulse at any given time will cause the device to produce a sound or say something. The result can be achieved in ways other than those disclosed in detail by way of example herein. One of the desired effects is that of achieving the impression that the sounds are of spontaneous origin rather than a repetition in the same or other predetermined order of a recorded program of sounds. The input impulse or stimuli to the device can also be provided by automatic means, or by a timer mechanism operative to trigger individual speeches or discrete parts. Also selected predetermined or random discrete sound parts of the sound producing means can be arranged to simulate the identity of a "naughty baby," "good baby" or the like distinctive moods. Thus, this invention contemplates both sequential and random speech patterns or either selectively.

The concept is, therefore, by way of example, that of a doll which is highly personified in that it will speak in response to impulses and what it says may or may not be predictable. What the doll says has the effect of being original to thereby impute to the doll a personality of its own such as is possessed by a human. The doll will in effect, talk with or have a conversation with the child playing with the doll, the doll being capable of making statements at random which are unexpected and unanticipated just as the sayings of a young child are unpredictable and are identified with the child's personality. A doll embodying the said concept provides a very intriguing toy for a child to play with by reason of this characteristic ability to virtually speak for itself. Such a toy is one having the highest entertainment value and appeal to a young child.

The concept may be adapted in a doll or, of course, it could be adapted in the figure of an animal likewise or simply in the figure of a head. In practicing the concept, means are provided within the doll embodying a collection or "library" of sayings which can be individually caused to be pronounced in response to any type of impulse or manipulation. In other words, any type of impulse may be utilized to cause the doll to speak at random, this is, to pronounce one of the sentences, for example, in its collection or library stored within it. The speaking mechanism is, of course, of a particular nature such that, in response to a given impulse, the mechanism will speak any one of its sentences or other sounds.

In a preferred manner of carrying out the concept of this invention, a novel and original phonograph device is provided. The device is in the form a phonograph having a record and constructed to be adapted to fit within the body of a doll. A feature of the device is that the record used has a plurality of spaced spiral grooves which are separate in a sense that each reproduces a separate and distinct sentence or other distinctive sound.

The device involves a construction and arrangement of parts making it extemely compact, rugged, durable and effective. Means are provided whereby in response to a simple manipulation, such as, for example, the pulling of a drawstring, the needle of the tone or reproducing arm is lifted from the record and moved to the periphery, that is, to the starting point of one or another of the spiral grooves. The tone arm moves relatively to the reproducing cone or disc which is stationary and novel and improved constructional features are embodied in this part of the device.

The primary object of the invention is the implementation of the concept of a speaking doll (or other figure) which will literally speak for itself in response to a given impulse saying things.

A further object is to provide a doll or other device as in the foregoing which is able to, in effect, carry on a conversation of its own with a child playing with it.

A further object is to provide improved phonograph devices or speaking mechanisms which, in response to a given impulse, are able to reproduce various sounds, sentences and/or expressions, selectively, either in predetermined sequence or at random.

Another object of the invention is to provide a phonograph as in the foregoing, having a record having a plurality of spaced spiral grooves or sound tracks each capable of reproducing a separate sentence or other separate distinct sound.

A further object is to provide a phonograph as in the foregoing, having a tone arm cooperating with the record and movable relatively to a sound reproducing cone or disc.

Another object is to provide a construction as in the foregoing, including a driver spring interposed between the reproducing cone and the tone arm.

Another object is to provide a phonograph as set out in the foregoing, having manual means so arranged that by a single simple manipulation, the tone arm may be lifted and returned to the starting point on the record, this movement being relative to the reproducing cone or disc which is stationary.

Another object is to provide a phonograph device as in the foregoing, having indexing means whereby upon each control impulse the sound from a predetermined track is reproduced.

Another object is to provide a device as in the foregoing which is governor controlled.

Further objects and numerous additional advantages of the invention will become apparent from the following detailed description and annexed drawings, wherein:

FIG. 3 is an enlarged sectional view of the phonograph device taken along line 3—3 of FIG. 2;

FIG. 5 is a sectional view taken along the line 5—5 of FIG. 4;

FIG. 6 is a sectional view taken along the line 6—6 of FIG. 5;

Figure 1:
FIG. 1 is a view of a doll having the invention embodied therein.

FIG. 1 of the drawings is a diagrammatic view of a doll having the invention embodied therein. The doll shown in FIG. 1 is representative of any doll or any other figure, or simply a head in which the concept may be embodied. The mechanism within the doll which produces sound is in the form of a phonograph or phonograph device, as designated at 11. In the form shown, it is operated by a drawstring or pull cord 12, attached to a ring 13. A part of the body of the doll is designated at 15 in FIG. 2, having the phonograph device 11 in the torso thereof. The body may be of molded plastic having an eyelet 17 through which the cord 12 passes with the ring 13 disposed at the back of the doll, as shown in FIG. 1, where it can be conveniently pulled and released by the child. All of the mechanism is very rugged and sturdily built so that pulls exerted on the cord by the child, whether complete or incomplete, will not damage the mechanism.

As shown, the body 15 has transverse molded members in it, as designated at 20, 21 and 22, which assist in holding the device 11 in position. The phonograph device 11 has an extending collar 24 within which is the speaker cone, as will be described hereinafter. The collar 24 fits within a circular conformation 25 extending inwardly from the body 15. The body may be made of molded plastic or similar material. Fitting within the circular ring or conformation 25 is a ring-shaped member 27, the outer part of which 28 is perforated as shown and is contoured to conform to the outer contour of the figure of the body. The member 27 is held in position by an extending flange of the opening in the body 15 and preferably a circular piece of flesh colored fabric 29 is positioned over the contoured body part 28 and held between the ring 27 and the flange around the opening in the body.

Figure 2:
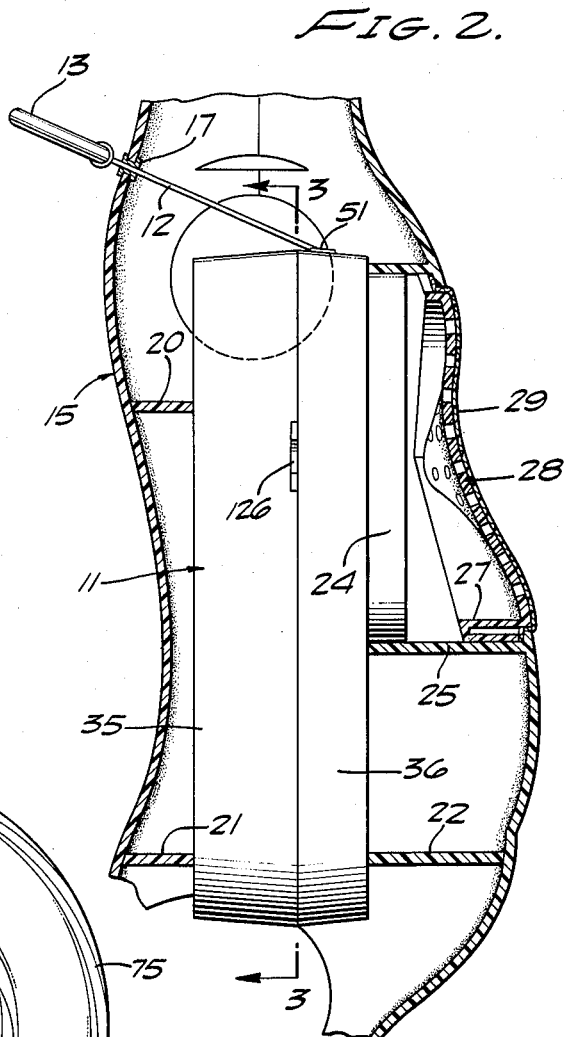
FIG. 2 is a sectional view taken along line 2—2 of FIG. 1.

FIGS. 1 and 2 illustrate any preferred manner of mounting the speaking mechanism or phonograph device in a doll's figure, and the arrangement of the means for applying impulses or manipulating it to cause it to speak at random, as described in the foregoing, and hereinafter.

FIGS. 3 to 12 of the drawings illustrate an original and preferred type of speaking or sound making device which may be utilized in practicing the concept of the invention.

Referring now more in detail to the drawings and more particularly FIGS. 3 to 6, the phonograph device 11 is shown by way of example as embodied in a plastic housing or casing having a lower portion or half 35 and a cap or cover 36 as seen in FIG. 6. The housing may have the shape as shown in FIG. 3 but, of course, may have other shapes and configurations. Preferably, the bottom part 35 has a continuous peripheral shoulder 37 which fits against the lower edge of the cap or cover 36 when it is in position and the two parts may be additionally secured together by tongue and groove securements.

As may best be seen in FIG. 5, the device may be said to comprise the assemblies including the record device assembly designated generally at 39, the governor assembly designated generally at 40 and the tone arm and reproducing and indexing assembly designated generally at 41. The housing 11 is configurated to accommodate these various assemblies.

Within the upwardly extending circular rim or flange 24 is positioned the reproducing cone 43. The edges of the cone 43 are adjacent the bottom of the rim 24 and the circular opening 45.

Numeral 46 designates an inwardly extending bracket on the inside of the top or cap 36 which forms a support bearing or journal for the record spindle as will be described. Numeral 47 designates an integral bracket extending downwardly and inwardly from the inside of the top of the casing 36 which may be utilized for the purpose of mounting different types of attachments or controls for the mechanism.

Numeral 49 designates a downwardly extending circular skirt integral with the top of the cap member 36 which forms a drum or housing around the governor assembly 40 as will be described presently. Numeral 50 designates a central inwardly extending boss in the bottom of the housing having a central bore which forms a bearing for the lower end of the record spindle as will be described.

Numeral 51 designates an eye or eyelet in a side of the casing to accommodate drawstring 12 as will be described for operating the record playing or phonograph mechanism.

Figures 8, 11:
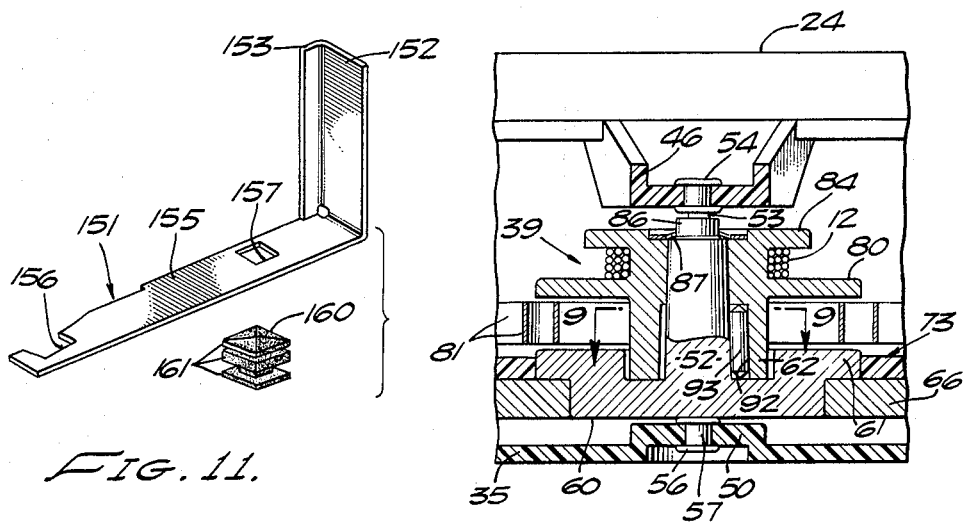
FIG. 8 is a sectional view taken along line 8—8 of FIG. 5.
FIG. 11 is a perspective view of an indexing lever.
Figure 12:
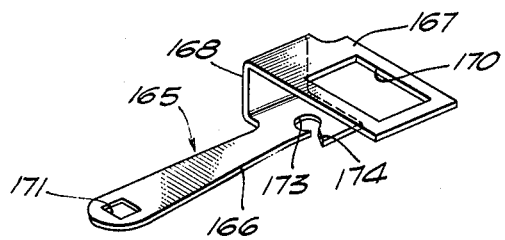
FIG. 12 is a perspective view of another indexing lever.

The record or rotor spindle is designated at 52 having a cross-sectional configuration as best seen in FIG. 8. The upper end 53 of the spindle is journalled in a bushing 54 in the bracket 46. The lower end 56 of the spindle is journalled in a bushing 57 mounted in the boss 50.

The record spindle 34 has a circular portion 60 and a larger circular portion 61 which is offset upwardly from the part 60 as shown so as to form an annular opening or depression in which is received the lower end of the driving spring arbor 62 as will be described presently. Attached or secured to the spindle 52 is a circular disc or turntable which may be made of either plastic or metal, as shown at 66, this disc having a central bore which fits around the part 60 of the spindle. At the periphery of the disc 66, it has continuous gear teeth as shown at 69. The record itself is designated at 73 and it may be attached to the disc 66 by being glued or cemented thereto. The gear teeth 69 drive pinion gear 106 which drives the governor as will be explained.

The record 73 in itself is unique and it is unique in its cooperation with the other parts of the phonograph. It has a plurality of individual interleaving spiral grooves as may be seen in FIG. 10, each of which is a separate sound track on which is recorded a distinctive sound, for example, a distinctive complete sentence.

As will be explained more in detail hereinafter, upon each operation the needle may be indexed to engage one of the grooves in the record. The indexing mechanism may be disabled, the device having a built-in random characteristic which is then effective. The details of this mechanism will be explained presently.

Another feature of the record 73 is the "fast pitch" lead-in section of each groove as designated at 75. These lead-in sections as can be seen have greater spacing than there is between the grooves in the body of the record. Thus, by this special and deliberate means used with the multi-groove design, the needle is able to select separate tracks dependably. An advantage of the "fast pitch" groove area or "selection band" at the edge of the record is that slight irregularities or damage to each groove do not cause the needle to fall into one groove at the expense of another. That is, otherwise, a small scratch or irregularity might cause one groove to be played whenever the needle falls into it initially or into an adjacent groove, resulting in inoperativeness of the said adjacent groove. Each spiral also has a fast lead-out, as shown.

Another advantage and conspicuous feature of the multi-track interleaved groove record in its cooperation with the remaining parts of the device is that no matter where the record is engaged by the needle, the needle engages a part of the track immediately adjacent to the beginning of the sound on that particular track; that is, it is unnecessary for the record to progress through a full turn of blank groove to insure that the needle is engaging in a groove at a point preceding the beginning of the sound material in the groove. The device operates to produce sound promptly after the engagement of the groove by the needle so that there is no waste turning of the record and no waste of power and wind-up capacity and the device responds audibly almost immediately. The arrangement insures that the needle will engage the beginning of one sound groove or another with the minimum possible lapse of time after the tone arm has been moved to engage the record.

The spring arbor 62 has the configuration as shown in FIG. 8 having a central bore, the upper part of which fits over the slightly tapered spindle 52. It has an extending circular part 80 spaced from the upper end of the arbor forming a pulley as will be described. The driving spring is a clock spring as designated at 81, the inner end of which is secured to the spring arbor 62 as may be seen in FIG. 9. The other end of the spring 81 extends outwardly through an opening in the side of the casing 11 and is looped as shown at 83 in FIG. 3 to hold it. This loop may have any of various configurations.

At the upper end of the arbor 62 is a disc 84. The upper end of the spindle 52 has a portion 86 of smaller diameter and engaged on this portion is a retaining ring 87 which bears against the shoulder of spindle 52 adjacent its portion 86. The periphery of the retaining ring 87 engages with the arbor 62. The disc 84 has radial hole 90 and at this hole is a knot 91 at the end of drawstring 12 which wraps around the pulley, that is, the upper part of arbor 62 between disc 84 and the extending circular part 80. The drawstring extends through the tone arm assembly 41 as will be described presently, through the eyelet 51 to the exterior of the housing and is attached to ring 13 for convenient grasping and operating by a child, for example.

Pulling on this drawstring rotates the pulley, that is, the arbor 62, and winds up the clock spring 81 and the spring is then able to drive the record disc. A one-way clutch or drive is provided between the record spindle 52 and the spring arbor 62. This construction is illustrated in cross-section in FIG. 9. On the inside of the lower skirt portion of spring arbor 62, it has the angularly spaced axially extending grooves 92, the surfaces of which curve outward slightly in one direction. Disposed in these spaces between the skirt of arbor 62 and the spindle 52, are the rollers or bearing members 93, as may be seen in FIG. 8. When string 12 is pulled arbor 62 moves in a counter-clockwise direction, the rollers 93 move to the under part of the openings or spaces so as to not frictionally engage between the arbor 62 and the spindle 52 and to thus wind the spring without driving the record. The effect is that when the spring 81 is wound by pulling on the drawstring 12, the record disc is not rotated. The record disc 73 is, however, rotated by the spring 81, when the string 12 is released, the clutch then engaging by rollers 93 moving into the narrow part of the grooves or slots. When pull ring comes against the stop eyelet 17 the clutch disengages and the turntable 66 can coast or overrun thus altering the relationship between the drive means and record.

It has a plurality of separate spaced grooves or tracks on each of which, by way of example, is recorded a separate sentence such as might be spoken or pronounced by a child and figuratively, by a doll. As will be explained presently, when the tone arm with the needle is moved to the periphery of the disc, it engages one or another of the spiral grooves and depending upon which one it engages, a different sentence or a different distinctive sound will be reproduced.

Means are provided in the form of a rotary governor to regulate the speed at which the record disc is driven, this assembly being designated generally as previously pointed out at 40. It comprises a rotor member, as designated at 98, having an upper end or spindle 99 journalled in a bushing 100 in the top of the housing 11. It has a lower end or spindle 102 journalled in a bushing 103 in the bottom of the housing part 11. The rotor member 98 has a lower extending web 105. Adjacent the lower part of the portion 104 is a drive gear 106 meshing with gear 69. It should be understood, of course, that other types of drives such as belt drive may be utilized for driving the governor.

Numeral 108 designates an upper web member similar in shape to the web member 105. Web member 108 has a central bore which fits over the upper end portion of the rotor member 98. Fitting between the ends of the web members 105 and 108 are posts or pins, as shown for example at 115, the ends of which are tapered fitting into bores or openings in the webs. There are two radially movable governor members or weights movable outwardly under the influence of centrifugal force pivotally mounted on these posts. These members are identical and therefore only one will be described in detail. One of them is designated at 112. It comprises an arcuate weight portion 113, having a mounting arm 114 connected integrally to pin 118 journalled, as shown between webs 105 and 108. Numeral 119 designates a torsion spring wrapped around the pin 118. One end of this spring engages a post extending upwardly from the web member 105. The other end of the torsion spring engages with a portion of the weight member 112 so that it is normally urged inwardly, that is radially, and this movement is limited by a stop member on the web 105 of the rotor 98.

The weight member 112 has a radial slot in which is disposed a strip of fabric as shown at 121 or other suitable material which serves as braking material. The governor operates in a manner which will be readily understood by those skilled in the art. It is driven at a suitable or appropriate speed, as described. As the speed increases, the weights or centrifugal members move outwardly under the influence of centrifugal force and against the force of the torsion springs. The fabric members 121 may engage the interior surface of the skirt or drum 49 so that this frictional engagement retards or restrains rotation of the governor and thus limits the speed of rotation. In this manner, the speed of rotation of the disc or record 73 is controlled and regulated and maintained at the optimum speed for desirable reproduction of sounds.

Numerals 122 and 123 in FIG. 3 designates stabilizing means which may be provided on the interior of the casing 11 for the purpose of providing additional support for engaging and stabilizing the rotor 98. These members are, however, optional and may be omitted.

Figures 7, 9:
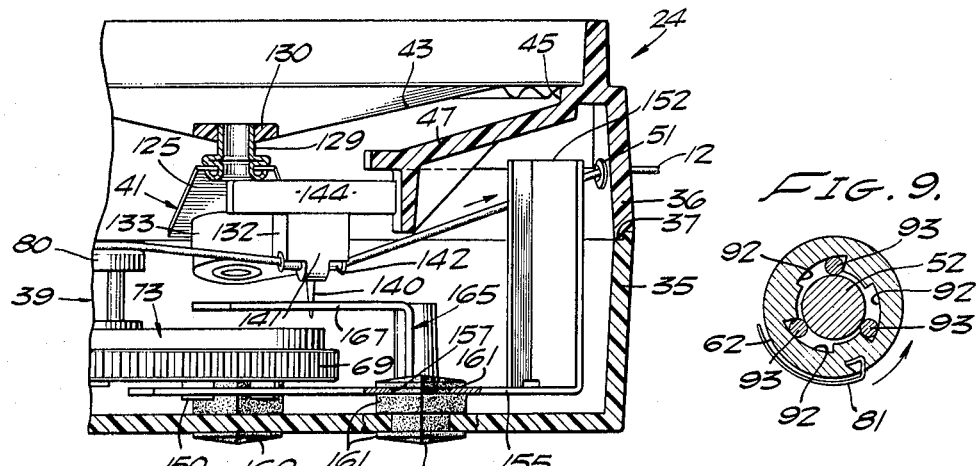
FIG. 7 is a view similar to the right hand part of FIG. 5 with the parts in another position.
FIG. 9 is a sectional view taken along line 9—9 of FIG. 8.

The tone arm, reproducing assembly and indexing means which has been designated at 41 is shown in cross-section in FIGS. 3 to 6, and certain of the parts are shown enlarged in FIG. 7. Numeral 125 designates a flat driving spring for the reproducing cone 43 having the shape as may best be seen in FIGS. 3 and 6. It is mounted in the casing or housing 11 in a position below the reproducing cone 43. At its ends it has tongues as shown at 126 and 127 engageable in slots or openings in the casing 11 for securement. The tongues 126 are in the form of laterally extending hooks as shown which may hook into openings in the casing 11 with the tongue 127 extending into an opening or groove in the opposite side of the casing.

At the center of the spring 125, it has an opening and at this point is secured the lower end of a small tubular member 129, the securement preferably being by way of the flanges as shown adjacent the opening in the spring as may be seen in FIG. 7. The tubular member 129 extends through an opening in and mounts the reproducing cone 41 which may be additionally secured to the member 129 such as by way of glue or wax as indicated at 130.

The tone arm is shown more in detail at 132 in FIG. 6. At its left end it has an integrally formed bushing 133 having a bore journalled on a pin or eyelet 135 having flanged ends which is mounted from the spring 125 as shown. The arm 132 has a central depression 136 (FIGS. 3 and 4) adjacent which are longitudinally extending webs 137 and 138 so that the tone arm is very light. It may be fabricated from plastic, for example. The needle 140 is mounted slightly angularly as shown at the end of the tone arm and beyond the needle the tone arm has a portion 141 in which is positioned transversely an eyelet 142 having flanged ends as shown and through which passes the drawstring 12. Near the end of the tone arm at its upper part is a transversely extending rib 144 which slidably engages the flange or rim at the lower end of the tubular member 129 which as described is attached to the driving spring 125 for the reproducing cone. The tone arm is movable about its pivotal mountings so that the needle 140 can be swung from an intermediate point on the recorder, that is, from the end of the playing surface to the periphery. When the tone arm so moves, the rib 144 slides frictionally relative to the lower end of the tubular member 129. That is, the reproducing cone 43 does not move with the tone arm itself; these parts move relatively.

As may be seen in FIG. 5, the eyelet 143 in the end of the tone arm is slightly below the circular part 80 of the pulley around which the drawstring 12 is wrapped. Normally, in operation when the needle has moved to the interior of the playing surface of the record 73, the drawstring 12 is then manipulated, that is, it is pulled or tensioned by the drawstring 12 by grasping and pulling the ring 13. The tension in the string or cord 12 is sufficient to lift the tone arm 132 from the surface of the record against the force of the spring 125 which may bend or bow slightly to accommodate this purpose. As the cord or string 12 is pulled, the friction between it and the interior of the eyelet 142 is sufficient to move the tone arm to the exterior or periphery of the record 73. At this point, its movement is terminated or stopped by a stop member 146 extending from the bracket 47. The engagement of the tone arm with the stop 146 does not restrain continued movement of the drawstring or cord 12. Pulling on the drawstring, of course, winds the spring 81, as previously described, by rotating its pulley and this operation, as stated, is not terminated or prevented by reason of the tone arm having been returned to its starting position. The spring 81 may be completely wound by one extended pull on the drawstring. However, less extended or shorter pulls may be exerted on the drawstring simply for the purpose of resetting the tone arm to the initial position to reproduce the different sentences or distinctive sounds from the record 73. Each of such shorter pulls partially winds the spring 81, the winding being accomplished through the one-way clutch or drive, as previously described. As may be observed, therefore, the particular nature of the mechanism provides a construction which is simple and effective, but yet very rugged and durable and capable of withstanding rather rough treatment. Particularly, it will withstand and properly respond to any manipulations that may be made by a child who does not, of course, understand the details of the mechanism, but perceives only that by pulling the drawstring, the device will be caused to reproduce sounds. The nature of the mechanism is such that it does not impose a requirement on the operator that the length of pull of the drawstring or the force exerted must be nicely judged or gauged. The device, therefore, accommodates itself very well to the treatment expected to be given it by children.

While the record is being played, the governor is, of course, being driven in the manner previously described and as explained the governor regulates and controls the speed of rotation of the record to provide for optimum reproduction conditions.

Associated with the mechanism just described is the indexing mechanism which is operated concomitantly with the movements of the tone arm.

The bottom of the turntable 66 is provided with a plurality of equally spaced indexing pins, lugs or abutments, as designated at 150.

Figure 10:
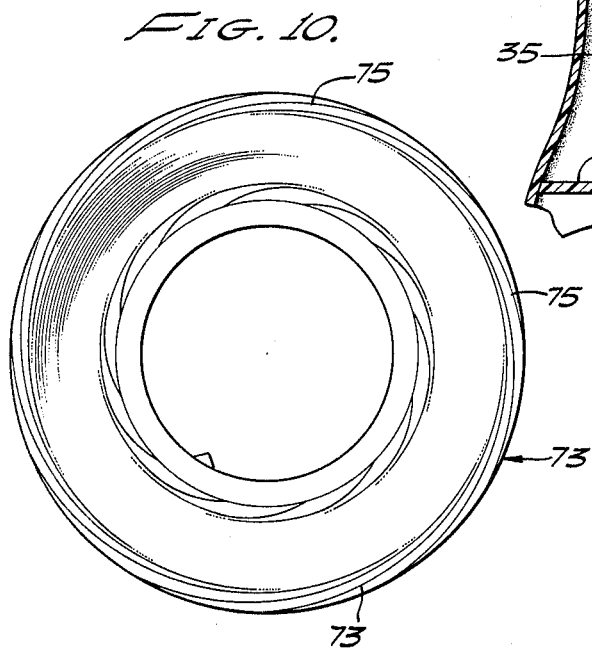
FIG. 10 is a plan of the record.
Figure 4:
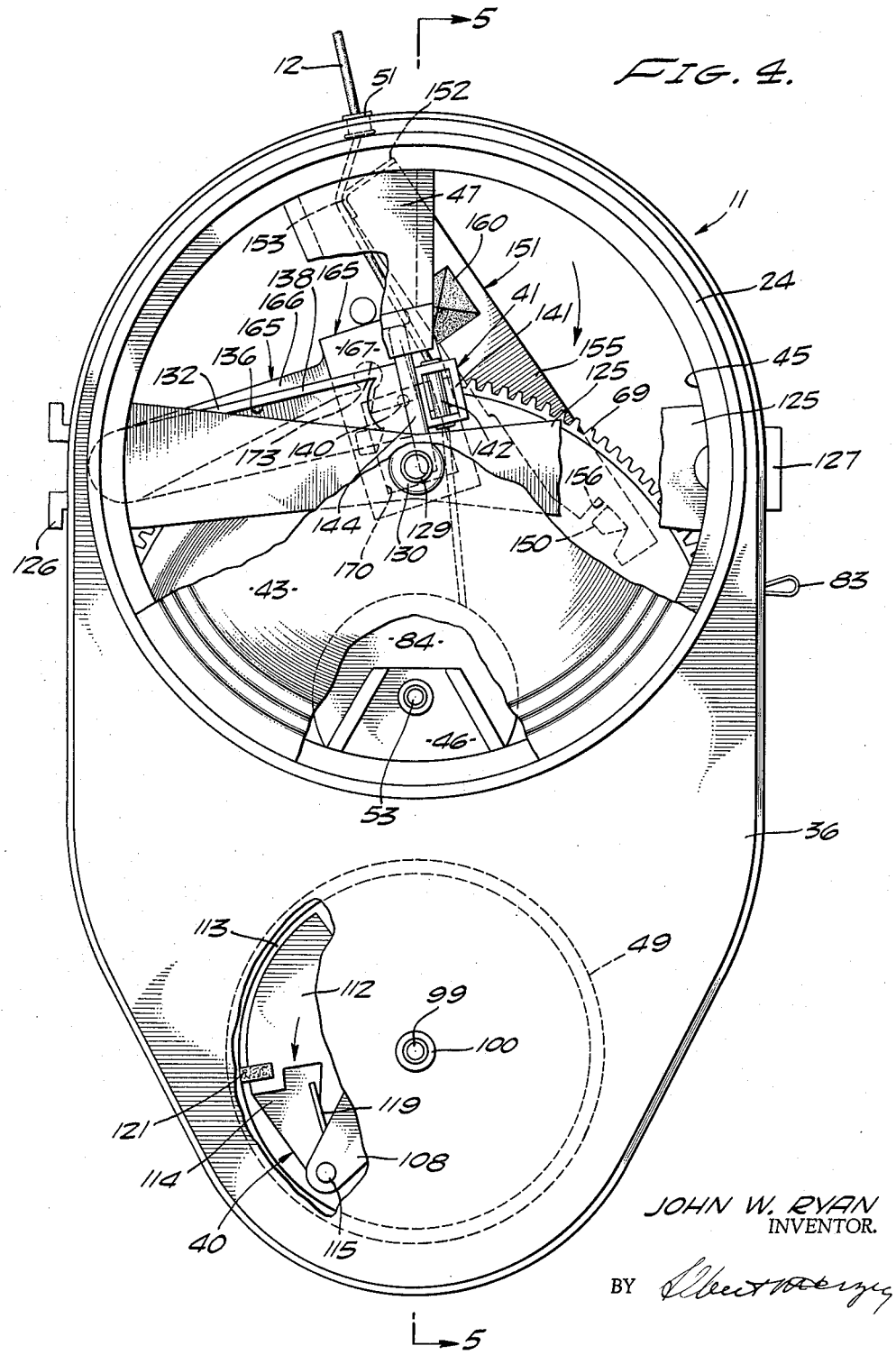
FIG. 4 is an enlarged plan view of the phonograph device partly broken away.

As pointed out in the foregoing, the device provides an indexing mechanism so that each time the drawstring 12 is manipulated, the turntable is held and indexed so that the needle engages the next spiral groove of the record as shown in FIG. 10 so that whatever is recorded on the record, each groove is played in sequence. The indexing mechanism provides one latching or indexing member to latch and hold when the cord 12 is pulled and another one which is actuated by the needle when it reaches the inside of the record.

The actuation of the indexing mechanism may best be described with reference to FIGS. 3 to 7 and 11 and 12. FIG. 11 at 151 designates one of the indexing levers having an upright part 152 with a curved edge 153 which is engaged by the drawstring and an angular part 155 having a cut-out 156 at its end forming a hook as shown which engages with the indexing pins as will be described. Numeral 157 designates a square hole in the member 150. It is mounted by way of a flexible rubber element, as shown at 160; this element is shown having a square configuration having a central shank and extending flexible webs as designated at 161. It provides a means for rotatably mounting the lever with the opening 157 engaged between webs 161 and the bottom of the casing 11 engaged between webs, as may be seen in FIG. 6. Thus, a flexible pivotal mounting is provided. FIG. 3 shows the position in which lever 151 is mounted.

Numeral 165 designates the other indexing or latching lever; this being the one that is operated by the needle. It has a part 166 and an extending part 167 integrally connected by offset portion 168. The part 167 extends at right angles and has a rectangular opening 170. The part 166 has a square mounting opening 171 and it has a latching or indexing hook part formed by the round opening 173 having an open side as shown adjacent a bevelled hooked end 174. The indexing lever 165 is pivotally mounted by way of the opening 171 so that the opening 170 in the part 167 is underneath the tone arm 132 and over the record as may be seen in the figures. That is, the needle 140 extends through the opening 170. See FIG. 5 particularly.

The rubber mounting members 160 are twisted torsionally when the indexing levers are rotated and thus return to normal position when the levers are released.

From the foregoing, the operation of the indexing mechanism will be understood by those skilled in the art. When the tone arm moves towards the inner part of the record and moves out in one of the leadout spirals, the needle will engage the outer edge part of the opening 170 in part 167 of lever 165 to rotate this lever in a clockwise direction looking at FIGS. 3 and 4. The hook formed by the openings 173 and edge 174 then engages one of the indexing pins or abutments 150 and positively stops the turntable and holds it in an indexed position which is aligned or accurately coordinated with one of the spiral grooves in the record 73. The operator may then pull the pullcord 12 in the manner described above to move the tone arm out to the outer edge of the record so that the needle can engage in another spiral groove. Upon this operation of the pullcord and movement of the tone arm, the lever 165 disengages, as may be seen, but the pullcord engages part 153 of lever 151, as may be seen in FIG. 3 or 4 and it is rotated in a clockwise direction, as may be seen, so that the hook 156 at its end promptly engages one of the indexing pins or plugs 150 to stop, hold and keep the turntable indexed. The angular movement of the tone arm is such that needle is now accurately positioned to engage the next lead-in groove of the record. As may be seen, therefore, the indexing mechanism provides for accurately playing the spiral grooves on the record in sequence. This is, of course, to be distinguished from operating, using the random characteristic. The indexing members, or latches, of course, may be disabled or not used in which event, the device has the built-in random characteristic which has been described in the foregoing. That is, without the indexing mechanism upon each manual operation the needle may engage unpredictably and at random and in any one of the spiral grooves.

From the foregoing, those skilled in the art will observe that the invention embraces the fascinating concept of providing a device which will figuratively speak for itself and is adapted to speak or say different things in response to a single control member. The invention embraces the concept of a device which a child, for example, may speak to and then receive a response from.

Those skilled in the art will also observe that the physical embodiment of the invention, as disclosed herein, provides novel and original features and structural arrangements providing for a very high degree of effectiveness and utility. The movements are extremely simplified and extraordinarily adapted to treatment to be expected from a child. The tone arm moves relatively to the reproducing cone not requiring that the latter be one of the moving parts.

The invention, in effect, provides means for truly personifying an inanimate thing, such as a doll, and virtually imputing a human personality to it.

It is to be understood that the invention is not to be limited to the precise forms and embodiments as disclosed herein since they are intended to be illustrative of the principles of the invention. The concept and principles of the invention may be embodied in other devices of larger size and adapted in other forms. The invention is to be accorded the full scope of the claims appended hereto.

What is claimed is:

1. In a phonograph device for use in a figure toy or the like, a record member movably mounted on said device and having recorded thereon a plurality of discrete sound sequences arranged to be separately reproduced, driving means mounted on said device and drivingly connected to said record member for moving said record member an amount to reproduce one of said sound sequences individually, movable sound reproducing means on said device mounted for selective engagement with said record member for reproducing the sound recorded thereon, manually operable means for positioning said reproducing means in engagement with said record member whereby to reproduce said sound sequences, and indexing means on said device and movable into engagement with said record member for indexing said record member to a predetermined position whereby upon repeated operations of the manually-operable means the said discrete sound sequences are reproduced in predetermined order.

2. In a phonograph device for use in a figure toy or the like, a record member movably mounted on said device and having recorded thereon a plurality of discrete sound sequences arranged to be separately reproduced, driving means mounted on said device and drivingly connected to said record member for moving said record member an amount to reproduce one of said sound sequences individually, movable sound reproducing means on said device mounted for selective engagement with said record member for reproducing the sound recorded thereon, manually operable means for positioning said reproducing means in engagement with said record member whereby to reproduce said sound sequences, and indexing means on said device and movable into engagement with said record member for indexing said record member to a predetermined position whereby upon repeated operations of the manually-operable means the said discrete sound sequences are reproduced in predetermined order, said indexing means including a mechanism mounted on said device and operable by engagement with said sound reproducing means upon completion of the reproduction of one of said sound sequences.

3. In a phonograph device for use in a figure toy or the like, a record member movably mounted on said device and having recorded thereon a plurality of discrete sound sequences arranged to be separately reproduced, driving means mounted on said device and drivingly connected to said record member for moving said record member an amount to reproduce one of said sound sequences individually, movable sound reproducing means on said device mounted for selective engagement with said record member for reproducing the sound recorded thereon, manually operable means for positioning said reproducing means in engagement with said record member whereby to reproduce said sound sequences, and indexing means on said device and movable into engagement with said record member for indexing said record member to a predetermined position whereby upon repeated operations of the manually-operable means the said discrete sound sequences are reproduced in predetermined order, said indexing means including a mechanism mounted on said device and operable by engagement with said sound reproducing means upon completion of the reproduction of one of said sound sequences, said indexing means further including another mechanism mounted on said device and operably connected to said manually operable means, to engage and hold said record member in said predetermined position while moving said sound reproducing means into position to again engage said record member.

4. In a phonograph device for use in a figure toy or the like, a record member movably mounted on said device and having recorded thereon a plurality of discrete sound sequences arranged to be separately reproduced, driving means mounted on said device and drivingly connected to said record member for moving said record member an amount to reproduce one of said sound sequences individually, movable sound reproducing means on said device mounted for selective engagement with said record member for reproducing the sound recorded thereon, manually operable means for positioning said reproducing means in engagement with said record member whereby to reproduce said sound sequences, and indexing means on said device and movable into engagement with said record member for indexing said record member to a predetermined position whereby upon repeated operations of the manually-operable means the said discrete sound sequences are reproduced in predetermined order, said indexing means including a mechanism mounted on said device and operable by engagement with said sound reproducing means upon completion of the reproduction of one of said sound sequences, said indexing means further including another mechanism mounted on said device and operably connected to said manually operable means, to engage and hold said record member in said predetermined position while moving said sound reproducing means into position to again engage said record member, each of said mechanisms comprising a lever swingably mounted on said device and having a holding portion swingable into engagement with said record member, and means normally biasing each lever to swing in a direction to move its holding portion away from said record member.

5. A device as defined in claim 4 wherein said record member is provided with spaced abutment means thereon, said holding portions of said levers comprising pawl-like formations engageable with said abutment means.

6. A device as defined in claim 5 wherein said record member includes a circular disc rotatably mounted on said device, said sound sequences being recorded in interleaved spiral grooves on said record member, each of said abutments being positioned in predetermined angular relation to an end of one of said spiral grooves.

References Cited by the Examiner

UNITED STATES PATENTS

| | | | |
|---|---|---|---|
| 2,555,800 | 6/1951 | Levine | 46—118 |
| 2,695,472 | 11/1954 | Ardolino | 46—98 |
| 2,794,647 | 6/1957 | Guest | 274—15 |
| 2,886,328 | 5/1959 | Duncan | 274—1 |
| 2,942,889 | 6/1960 | Duncan | 274—26 |
| 3,017,187 | 1/1962 | Ryan | 274—14 |

LOUIS J. CAPOZI, *Primary Examiner.*

ANTONIA GUIDA, *Examiner.*